United States Patent [19]

Yuji

[11] 4,359,836
[45] Nov. 23, 1982

[54] FISHING FLOAT

[76] Inventor: Kenji Yuji, No. 8-14, Aburatsu 2-chome, Nichinan-shi, Miyazaki-ken, Japan

[21] Appl. No.: 224,284

[22] PCT Filed: Oct. 22, 1979

[86] PCT No.: PCT/JP79/00266
§ 371 Date: Jun. 5, 1980
§ 102(e) Date: Jun. 5, 1980

[87] PCT Pub. No.: WO80/00778
PCT Pub. Date: May 1, 1980

[30] Foreign Application Priority Data
Oct. 23, 1978 [JP] Japan .................. 53-130627
Mar. 28, 1979 [JP] Japan .................. 54-37271

[51] Int. Cl.³ ........................................ A01K 91/00
[52] U.S. Cl. ........................... 43/44.9; 43/43.13; 43/44.87
[58] Field of Search ............. 43/17.5, 43.14, 44.87, 43/44.9, 43.1, 43.13

[56] References Cited
U.S. PATENT DOCUMENTS

| 2,712,194 | 7/1955 | Stefano | 43/44.9 X |
| 2,778,146 | 1/1957 | Peck | 43/44.9 X |
| 2,827,731 | 3/1958 | Haynes | 43/43.14 |
| 2,908,101 | 10/1959 | Butler et al. | 43/17.5 |
| 2,934,850 | 5/1960 | Moe | 43/43.13 X |
| 3,303,598 | 2/1967 | Spindler | 43/44.9 |
| 3,401,483 | 9/1968 | Bellah et al. | 43/43.1 X |
| 4,010,567 | 3/1977 | MacMillan | 43/17.5 |
| 4,268,988 | 5/1981 | Johnson, Jr. | 43/44.9 X |

FOREIGN PATENT DOCUMENTS

| 1105229 | 4/1961 | Fed. Rep. of Germany | 43/43.1 |
| 123384 | 11/1948 | Sweden | 43/44.9 |
| 254727 | 3/1948 | Switzerland | 43/17.5 |

Primary Examiner—James G. Smith
Attorney, Agent, or Firm—Oblon, Fisher, Spivak, McClelland & Maier

[57] ABSTRACT

The fishing float comprises a float main body made of a light weight material such as synthetic resin into a hollow or solid configuration and formed with a resistance portion or attached with a resistance body. Since the float main body (1) has a resistance body (2) such as in a disk-like shape at the circumference on its side or a resistance portion at its lower surface, a fish can automatically be caught on a fishing hook by the water resistance exerted upon pulling into the water.

1 Claim, 18 Drawing Figures

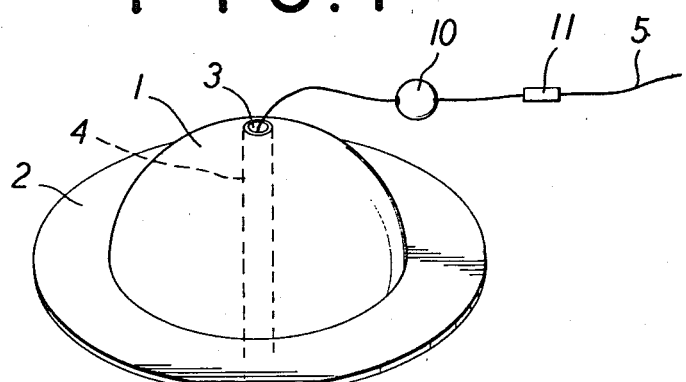
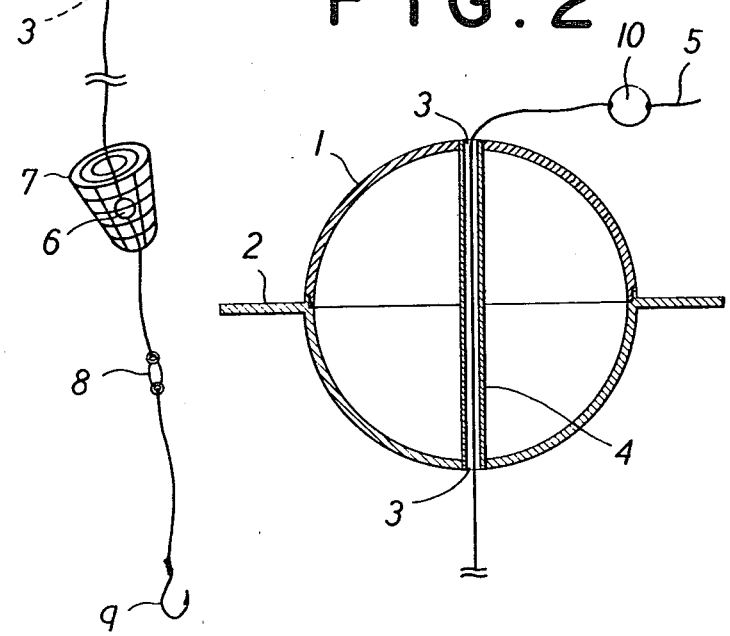

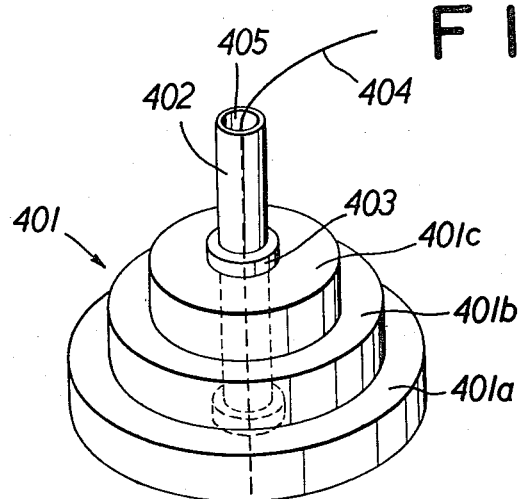
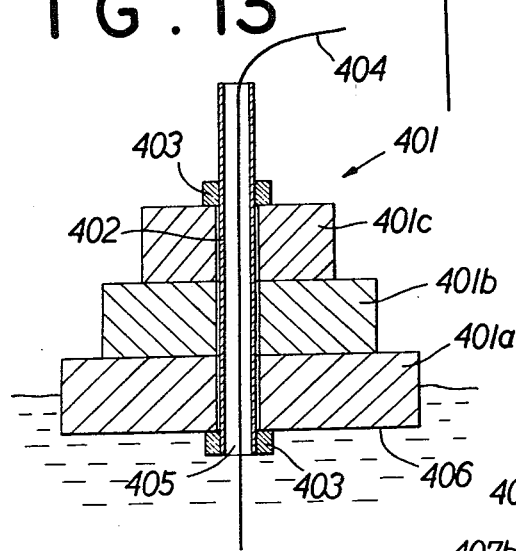
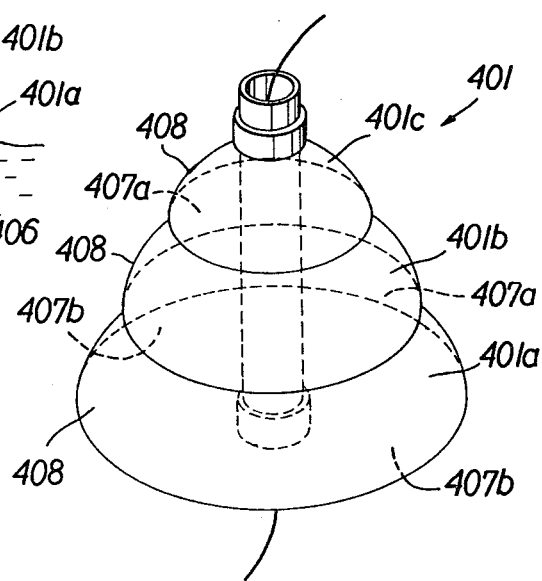

FISHING FLOAT

TECHNICAL FIELD

This invention relates to a fishing float and, more particularly, to a fishing float on which is formed a resistance portion on a float main body.

BACKGROUND ART

Conventional fishing floats have generally been designed to decrease the water resistance as low as possible so that even a fine fish reaction can be certainly transmitted to the float, and an angler jerks a fishing rod to hook a fish in response to the movement of the float. Insufficient hooking or mishooking is, however, caused frequently, since it is very difficult to jerk the rod exactly fit with the fish reaction and, also, the weight of the float itself and the water resistance acted on the float may hinder to transmit the jerking force sufficiently to the hook.

DISCLOSURE OF INVENTION

The characteristic feature of this invention resides in that a resistance member is formed on a main body of a float so as to increase the water resistance acted on the float when pulled into the water. This enables to automatically fit, without jerking a rod in response to a fish reaction, a hook to a fish by the resistance of water which is applied when the fish pulls the float into the water.

The improved fishing float according to this invention may be provided with a directional stabilizer plate vertically to the surface of the resistance portion. This can regulate the direction of the float thereby preventing it from rotation due to wind or tide flow which may otherwise result in twisting or entanglement of a fishing line.

Further, the float main body may consist of a plurality of float pieces vertically successibly connected in a detachable manner. In such a modification, the float main body can be adjusted to have a desired buoyancy and size depending upon fishes to be angled simply by the increase or decrease in the number of the float pieces.

BRIEF DESCRIPTION OF DRAWINGS

FIG. 1 is a perspective view of one embodiment of this invention;

FIG. 2 is a vertical cross sectional view thereof;

FIGS. 12 and 13 are a perspective view and a vertical cross sectional view of a still further embodiment of this invention;

FIG. 14 is a perspective view of a modification thereof;

BEST MODE FOR CARRYING OUT THE INVENTION

Figure 3:
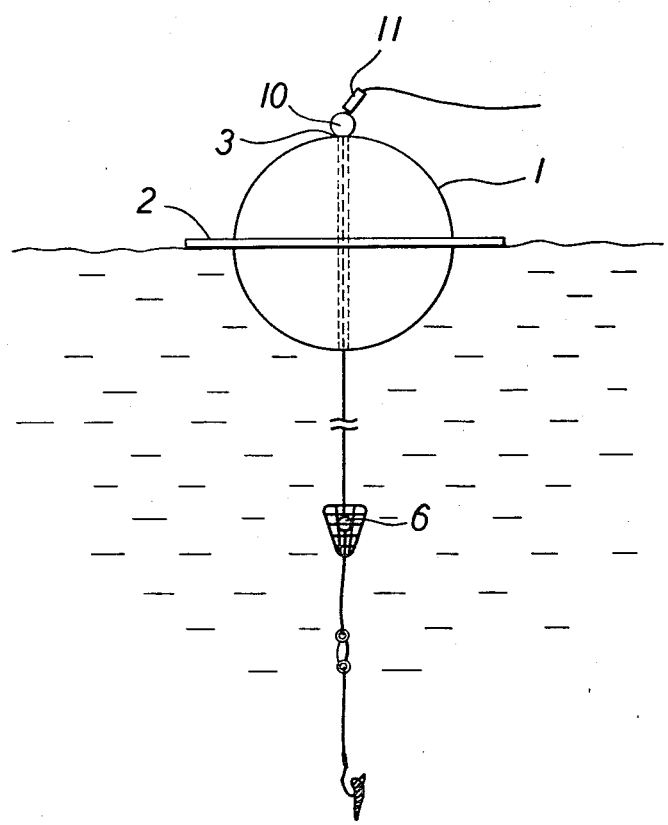
FIG. 3 is a front elevational view thereof in used state.

This invention will be described in more detail by way of the preferred embodiments referring to the drawings.

In FIGS. 1 and 2, the reference numeral 1 represents a spherical float main body which is shaped with a light weight material, for example, synthetic resin into a hollow configuration, to which an annular resistance body 2 is horizontally attached at the lateral circumference thereof. The resistance body 2 which is formed integrally with the float main body 1 by like light weight material facilitates to increase the water resistance when the float is pulled into the water by a fish. In addition, apertures 3, 3 are formed at the upper and lower centers of the main body 1 and a pipe 4 is inserted between the apertures 3, 3 to be secured in a water tight manner with the hollow space of the main body 1.

The float may take, in addition to the spherical shape, any other similar shapes such as an oval shape, and also it may not necessarily be limited to hollow configuration but can take a solid configuration made of a light weight material with sufficient buoyancy, in which an aperture equivalent to the through hole formed by the pipe 4 is formed along its center.

The drawings show, in no way limitative manner, one mode of using such a float wherein a fishing line 5 from a fishing rod (not shown) is passed downwardly through the pipe 4 in the main body 1, a weight 6 and a sink bait cage 7 being attached at its leading end, then a snell 9 being connected by way of a connecting means 8, while to the fishing line on the side of the rod a ball float 10 is slidably attached and a float stopper 11 is also secured.

Upon casting the float which was movably connected to the fishing line 5 in a set up manner just mentioned, tackles such as the weight sink to a depth where the float stopper 11 is engaged with the aperture 3 by way of the ball float 10 so that the float is kept under the balance with the weight 6 in an attitude that the resistance body 2 stands horizontal as shown in FIG. 3.

When a fish hits on a bait and pulls the float into the water, the great water resistance acted on the resistance body 2 and the buoyancy of the float main body 1 are exerted on the float against the pulling direction of the fish. Since the resistance and buoyancy have a similar effect which is caused by the jerking action of the fishing rod, the fish is automatically caught on the hook.

Figure 4:
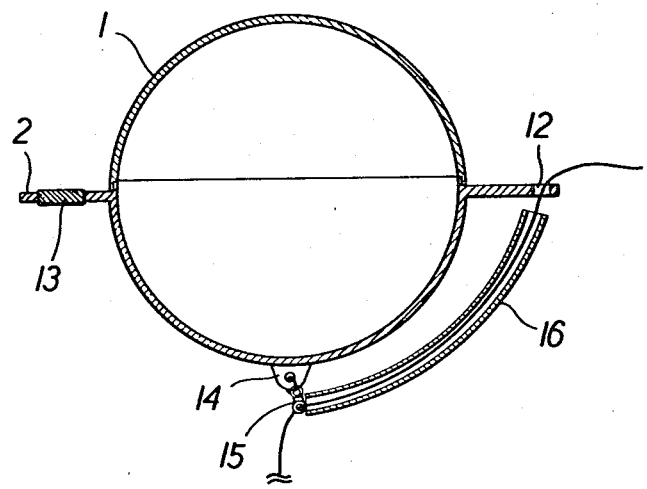
FIG. 4 is a vertical cross sectional view of a modification of the embodiment of FIG. 1.

FIG. 4 shows a modification of the embodiment shown in FIG. 1 and FIG. 2, wherein the annular resistance body 2 attached to the lateral circumference of the main body 1 is apertured at a part thereof with a through hole 12 through which the fishing line is passed and is secured at the other part with a small weight piece 13. A mount 14 is provided at the lower end of the float main body for mounting a connecting means 15.

The fishing line 5 extended from the fishing rod is passed, in order, through the hole 12, a line guide pipe 16 and the connecting means attached to the above mount 14. Accordingly, the aperture 3 and the pipe 4 in the previous embodiment are not necessary here.

Figure 5:
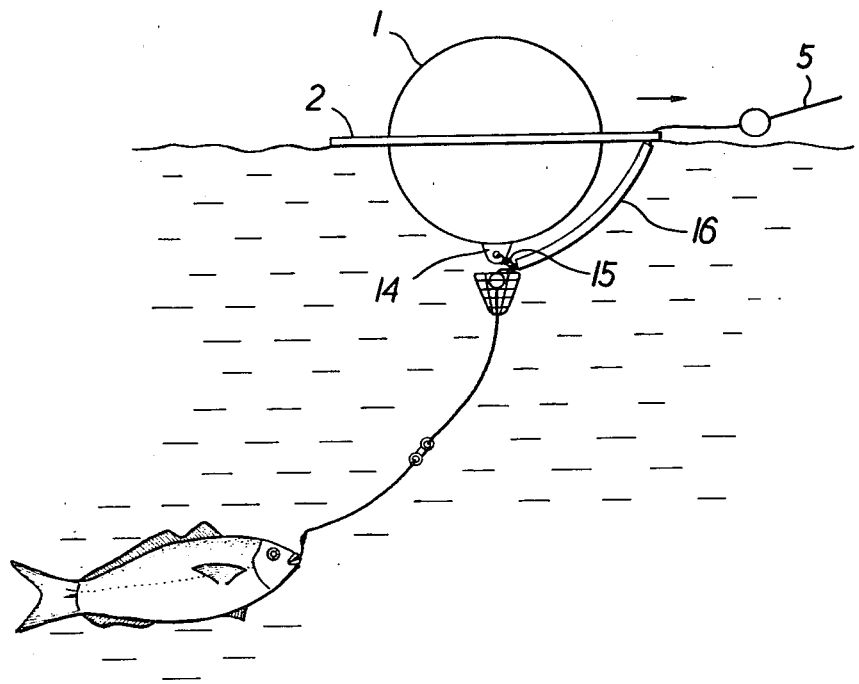
FIG. 5 is a front elevational view thereof showing in used state.

By passing the fishing line 5 from the fishing rod through the bore 12 in the resistance body 2, the float is pulled in the direction parallel with the resistance body 2 when taking in a fish caught on the hook as shown in FIG. 5. Consequently, the water resistance acted on the resistance body 2 can be reduced at the time of taking the fish in with a relatively lighter load. Moreover, the provision of the small weight piece 13 on a part of the resistance body causes the resistance body 2 to stand upright where the gravitational force of the weight 6 does not effectively exert on the float due to the fact that, for example, it is going to sink or it is at the bottom of the water. While, if the weight 6 exerts its gravitational force properly on the float, the resistance body 2 stands horizontal by virture of the sufficient weight of the weight 6. Then, this enables to judge the sinking attitude of the weight 6.

Figure 6:
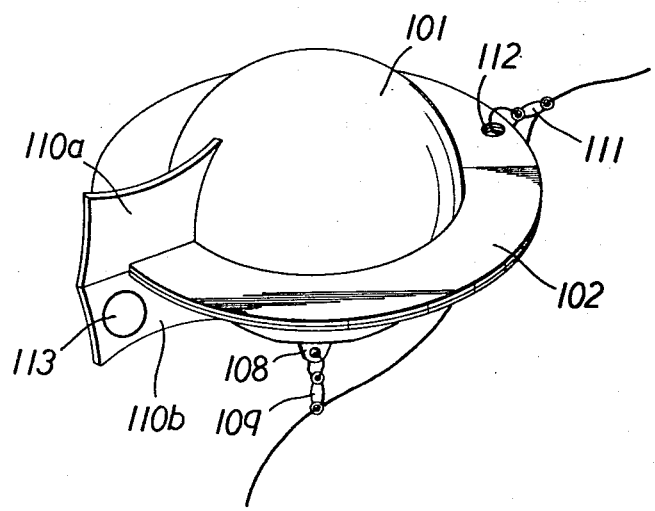
FIGS. 6 and 7 are perspective view and vertical cross sectional view of another embodiment of this invention.
Figure 7:
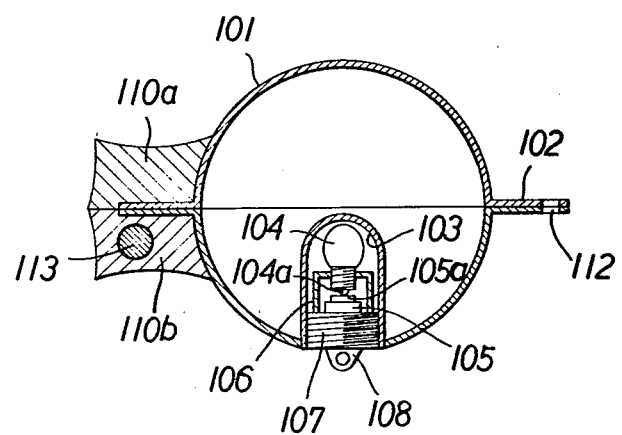

FIGS. 6 and 7 show another embodiment of this invention, in which a main body 101 which is formed with a light permeable synthetic resin into a hollow configuration has at its lower part a recess 103 for housing a light 104. The light 104 is mounted in an electroconductive receptacle 106 within which a cell 105 is accommodated, and the receptacle 106 is supported on a plug 107 threaded in a water tight manner to the above recess 103. The light 104 is adapted to be put ON and OFF by turning it along threads to attach and detach its terminal 104a to an electrode 105a of the cell 105. The plug 107 is provided at its lower surface with a mount 108 for mounting a connecting means 109.

The float main body 101 has an annular resistance body 102 which is horizontally attached on the lateral circumference in the same manner as the previous embodiment, and upper and lower directional stabilizer plates 110a, 110b being mounted vertically on one side of the resistance body 102 for regulating the direction of the float along the wind and tide flow. A bore 112 is formed on the other side of the resistance body 102 for mounting a connecting means 111.

When the float is exposed under the influence of wind or tide, the directional stabilizer plates 110a, 110b are caused to orient toward the downstream of the flow so that the attitude of the float remains constant, thereby free from such a trouble as twisting or entanglement of the fishing line which would otherwise occur by the rotation of the float.

Upon taking in a fish, not so greater water resistance is exerted on the float which is pulled in parallel with the resistance body 102 and in opposite to the directional stabilizer plates 110a, 110b to thereby extremely decrease the resistance exerted on the float upon taking in the fish.

The light 104 can be put ON by detaching the plug 107, and turning the light 104 to contact the terminal 104a at the lower end with the elecrode 105a of the cell 105.

A small weight piece 113 which has the same function as that of the weight piece 13 for the resistance body in the previous embodiment may be mounted on the directional stabilizer plate 110b.

Figure 8:
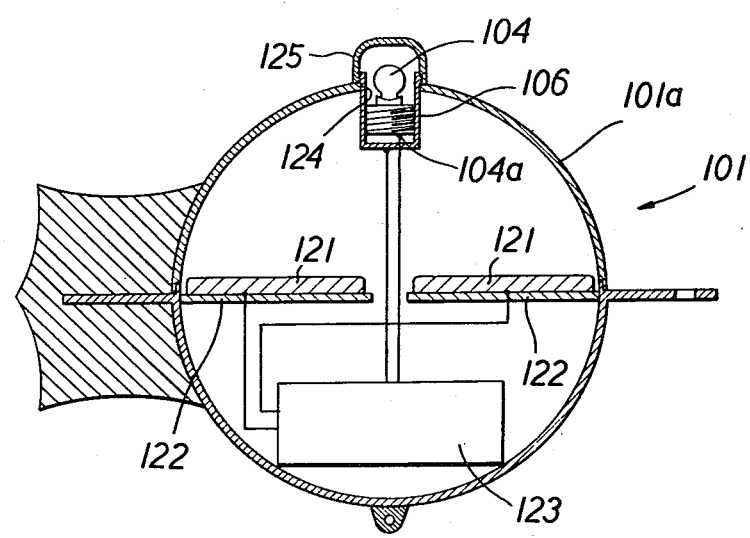
FIG. 8 is a vertical cross sectional view of a modification thereof.

In place of a usual cell, a solar cell can be used as shown in FIG. 8 for the electrical source of the light so that the electric power which was stored in a day time can be utilized in a night fishing. Specifically, a photoreception plate 121 for the solar cell is mounted on a support 122 which is accommodated in the main body 101 and thus obtained electric power is charged into a storage cell 123 provided below. The upper portion 101a of the float main body 101 which is made of an excellent light permeable material is formed with an opening 124 for putting in at its upper central portion a receptacle 106 in a water tight manner for mounting the light 104 which is connected with the storage cell. A transparent cap 125 is fitted in an water tight manner on the upper end of the receptacle 106.

The light 104 is put ON or OFF in the same manner as the foregoing embodiment by turning it along the threads so that the terminal 104a provided at the lower end of the light 104 is engaged with or disengaged from the other contact which is connected with the storage cell 123.

Figure 9:
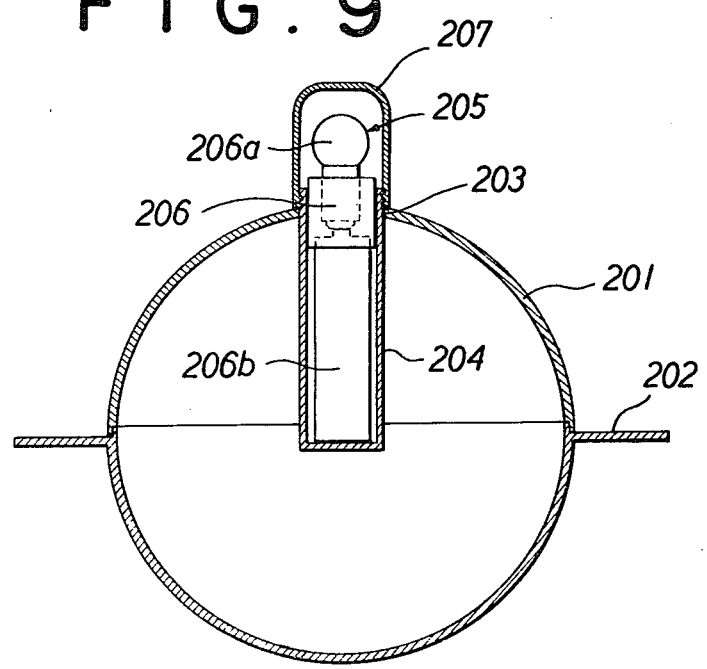
FIG. 9 is a vertical cross sectional view showing another embodiment of this invention.

Referring to FIG. 9 showing another embodiment of this invention, a light is detacheably mounted on a fishing float, wherein a float main body 201 which is attached a resistance body 202 at its lateral circumference thereof has at the upper central portion an opening 203 with which a cylindrical holder 204 having a closed end at the bottom is fitted in an water tight manner and a light 205 is detacheably fitted in the cylindrical holder 204.

The light 205 consists of a cylindrical main body 206, a lighting fixture 206a including a light emission diode or the like provided at the upper end of the main body 206 and an appropriate electrical source 206b replaceably inserted into the lower portion of the main body 206, further a transparent cap 207 being fitted onto the upper end of the cylindrical holder 204.

The float having the above construction can as well be used as an ordinary float by removing the light, in which a long marker rod can be planted in the cylindrical holder 204 to ensure for monitoring of the float in waves. It is a matter of course that the float can also be used, when lighting, as an electrical float in the night.

Figure 10:
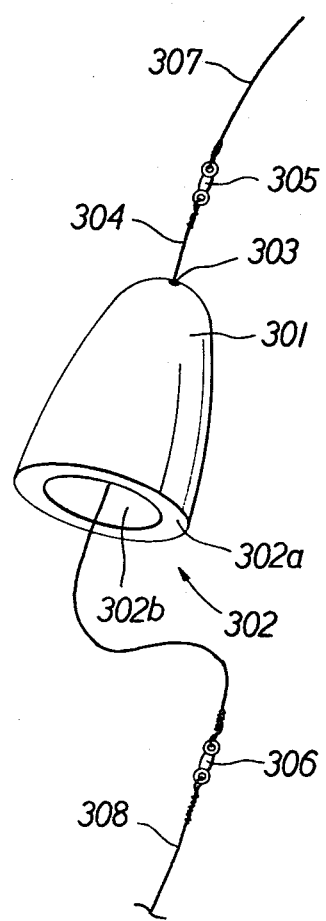
FIGS. 10 and 11 are perspective views of a still further embodiment and its modification of this invention.

FIG. 10 shows a bell-like float, in which a float main body 301 which is shaped in the form of a bell with a light weight material such as synthetic resin or foamed synthetic resin so as to possess a sufficient buoyancy is formed at its lower face a flat surface 302a vertical with the axial line and a concave 302b at its center, which constitute a resistance portion 302 against the downward movings. A line pass hole 303 is axially formed in the float main body 301, and a guiding line 304, for example, made of rubber is slidingly inserted through the line pass hole 303 and is connected at the opposite ends to a fishing line 307 and a leading line 308, respectively, by way of connecting means 305, 306 which also serve as stoppers.

Figure 11:
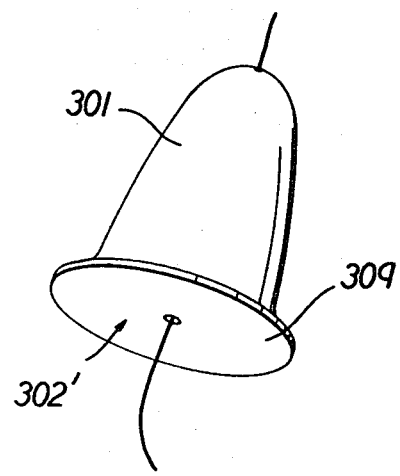

FIG. 11 shows a modification of the embodiment of FIG. 10, wherein a flat resistance portion 302' is formed by securing a larger diameter disk 309 to the lower surface of the float main body 301 to broaden the area of the lower surface of the float main body itself.

While in accordance with these embodiments a greater water resistance is imposed against the pulling force of a fish by the enlarged area of the resistance portion 302, water resistance which is exerted on the float main body 301 upon taking in a fish is reduced thereby ensuring to pull the fish with a lighter load.

FIGS. 12 and 13 show other embodiments for float main bodies which comprise a plurality of detachable pieces, wherein a float main body 401 consists of a plurality of disk float pieces 401a, 401b, 401c which are made of light weight material such as foamed resin having different sizes. They are inserted successibly to a cylindrical axial rod 402 with the most great diameter float pieces at the bottom. The upper and the lower float pieces 401c, 401a are fixed to the axial rod 402 by way of detachable stoppers 403, 403 composed of resilient rings or nuts, and the hollow portion in the axial rod 402 constitutes a fishing line connector 404 for admitting a fishing line 405.

Each of the float pieces 401a, 401b, 401c has parallel upper and lower surfaces and the underside of the lowermost float piece 401a forms a resistance portion 406. The buoyancy or water resistance can be varied by detaching the stoppers 403 and decreasing or increasing the number of these float pieces depending on the kind of fishes and conditions in particular fishings. The float height can also be increased by the increase in the number of the float pieces to allow visible even where the recognition of the float would be interferred by waves.

As shown in FIG. 14, the water resistance exerted on the float main body upon taking in a fish can be reduced remarkably by the use of a float in which the upper surface 407a of each of the float pieces 401a–401c is made smaller than the respective lower surface 407b to make a smooth curved surface on the respective circumference 408, then the float pieces being so connected each other that the adjoining surfaces of the stacked float pieces have approximately same diameters. In addition, the circumference 408 may be a linearly tapered surface.

Figure 15:
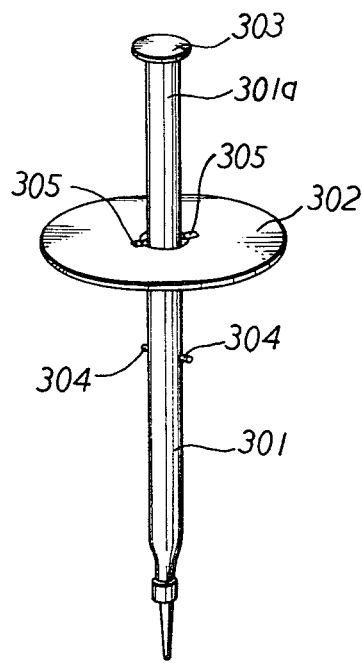
FIG. 15 is a perspective view of a still further embodiment of this invention.

FIG. 15 shown a rod-shaped float, wherein a float main body 501 is formed to have a configuration of a rod at least at its upper portion 501a to which an annular resistance body 502 is loosely fitted. The resistance body 502 is of such a shape as disk, inverted cup and the like that undergoes a great resistance in the water. While it is desired to form the body with a light weight material, e.g., wood, bamboo and foamed synthetic resin having the similar buoyancy as that of the float main body 501, it may be formed, for example, with synthetic resin or the like. Where the lower surface of the resistance body 502 is adsorbed on the water surface to restrict the movement of the float main body 501, it may be formed in such a shape as hardly to adhere with the water surface, for example, constituting relatively great unevenness on the surface. A stopper ring 503 is provided on the upper end of the upper portion 501a of the float main body for preventing the resistance body 502 from escaping upwardly. While on the other hand, a projection 504 may be provided on a part of the float main body that submerges in the water for preventing the resistance body 502 from escaping downwardly, and the resistance body 502 is removable from float main body 501 by a notch 505 provided in the resistance body 502 corresponding to the above projection 504. The lower portion 501 of the float main body 501 may of course be enlarged in diameter.

Figure 16:
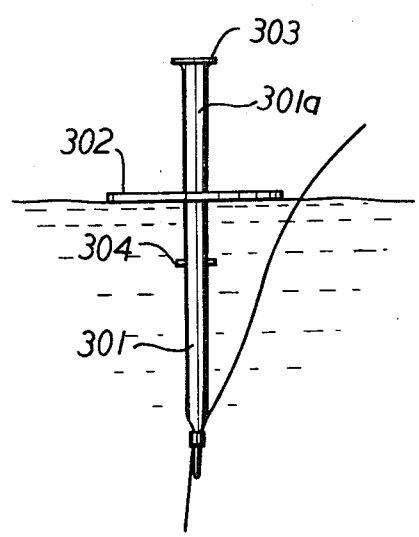
FIGS. 16 and 17 are front elevational views for the explanation of the operation of the float shown in FIG. 15.
Figure 18:
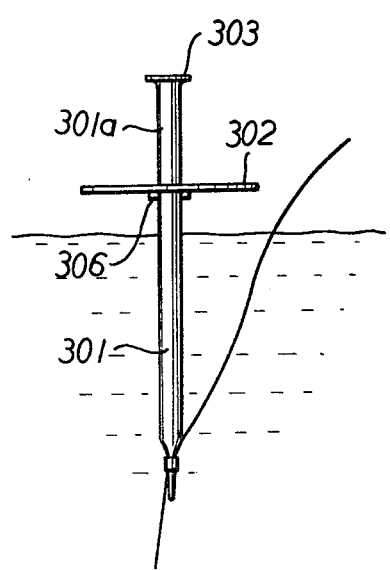
FIG. 18 is a front elevational view of a modification thereof.

The float having the foregoing structure is used in the same manner as in the ordinary float by connecting a fishing line, whereupon the resistance body 502 being floated on the water surface as shown in FIG. 16 or above the water surface as shown in FIG. 18. Where the resistance body 502 is situated above the water surface, a stopper 506 which has the above-mentioned anti-slip off function may be provided at a position of the float main body 501 above the water surface to define the lowermost position of the resistance body 502.

Figure 17:
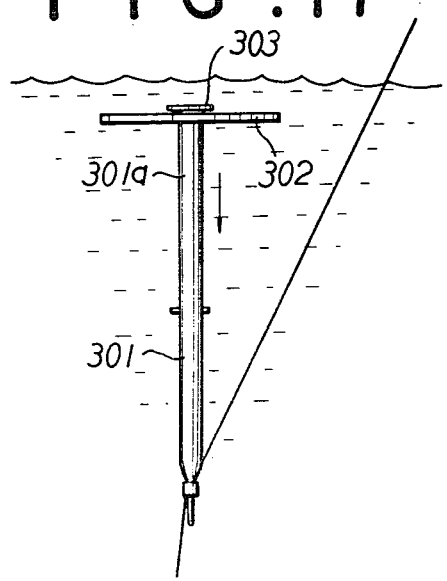

When a fish hits, the float main body 301 is pulled into the water with an initial low resistance, then the resistance body is pulled into the water as shown in FIG. 17 by abutting it with the stopper ring 503 which is provided on the upper portion 501a of the float main body so that the water resistance is suddenly increased. The increace in the resistance provides a similar effect caused by jerking action of the fishing rod. What is claimed is:

1. A fishing float comprising a float main body generally of a spherical configuration, an annular resistance body horizontally provided to the circumference of said float main body for increasing the water resistance when pulled into water, a directional stabilizer plate vertically mounted at one side of said float main body for regulating the direction of the float along the wind and tide flow, a small weight piece provided to said directional stabilizer plate for causing said resistance body to take an upright attitude in a state where a weight attached to a fishing line is not completely sunk, and an aperture is formed in said resistance body at the portion opposite the directional stabilizer plate for passing the fishing line therethrough and a mount is attached at the lower end of said float main body for mounting a connecting member for connecting the fishing line thereto.

* * * * *